United States Patent
Finlay et al.

(10) Patent No.: US 8,269,164 B2
(45) Date of Patent: Sep. 18, 2012

(54) MASS SPECTROMETER SYSTEM

(75) Inventors: Alan Finlay, West Byfleet (GB); Bharathram Ganapathisubramani, London (GB); Richard William Moseley, London (GB); Peter Edwards, Kingsfold (GB); Ariel Lipson, Tel Aviv (IL)

(73) Assignee: Microsaic Systems PLC, Woking, Surrey (GB)

( * ) Notice: Subject to any disclaimer, the term of this patent is extended or adjusted under 35 U.S.C. 154(b) by 414 days.

(21) Appl. No.: 12/380,002

(22) Filed: Feb. 20, 2009

(65) Prior Publication Data
US 2009/0212210 A1  Aug. 27, 2009

(30) Foreign Application Priority Data
Feb. 22, 2008  (GB) .................... 0803256.7

(51) Int. Cl.
    *H01J 49/26* (2006.01)
(52) U.S. Cl. .............. 250/288; 250/281; 250/282
(58) Field of Classification Search .......... 250/281, 250/282, 288
    See application file for complete search history.

(56) References Cited

U.S. PATENT DOCUMENTS

| | | | |
|---|---|---|---|
| 3,578,997 A | 5/1971 | Felici | |
| 4,186,590 A | 2/1980 | Egorov et al. | |
| 4,339,782 A | 7/1982 | Yu et al. | |
| 8,058,611 B2 * | 11/2011 | Wouters et al. | 250/288 |
| 2002/0060288 A1 * | 5/2002 | Hughey et al. | 250/281 |
| 2002/0190203 A1 * | 12/2002 | Valaskovic et al. | 250/288 |
| 2003/0019580 A1 * | 1/2003 | Strang | 156/345.33 |
| 2004/0021068 A1 * | 2/2004 | Staats | 250/288 |
| 2005/0077463 A1 * | 4/2005 | Small et al. | 250/288 |
| 2006/0108539 A1 | 5/2006 | Franzen | |
| 2006/0151692 A1 * | 7/2006 | Collings et al. | 250/290 |
| 2008/0258052 A1 * | 10/2008 | Jolliffe et al. | 250/282 |

FOREIGN PATENT DOCUMENTS

| | | |
|---|---|---|
| EP | 1629899 A1 | 3/2006 |
| EP | 1726945 A1 | 11/2006 |
| GB | 816681 A | 7/1959 |
| GB | 2463149 A | 3/2010 |
| JP | 2005285675 A | 10/2005 |
| WO | WO 03/010794 A2 | 2/2003 |

OTHER PUBLICATIONS

European Search Report for Great Britain Patent Application No. 09153241.6 dated Nov. 26, 2010.

Search report from UK Intellectual Property Office for related UK Application No. GB0803256.7, dated Jun. 22, 2008.

* cited by examiner

*Primary Examiner* — David A Vanore
*Assistant Examiner* — Nicole Ippolito
(74) *Attorney, Agent, or Firm* — Bishop & Diehl, Ltd.

(57) ABSTRACT

This invention describes a vacuum interface for a mass spectrometer system formed from a diverging nozzle. The vacuum interface may be used to transfer a beam of ions from an atmospheric pressure ionization source into a vacuum chamber for analysis by a mass analyser.

30 Claims, 7 Drawing Sheets

MASS SPECTROMETER SYSTEM

CROSS-REFERENCE TO RELATED APPLICATIONS

This application claims priority to United Kingdom Application GB0803256.7, filed Feb. 22, 2008, which is hereby incorporated by reference.

FEDERALLY SPONSORED RESEARCH OR DEVELOPMENT

Not Applicable.

TECHNICAL FIELD

The invention relates to components for use with a mass spectrometer system. In particular, the invention provides for an interface component that in various configurations acts as a means to transfer a beam of ions from one location to another. The interface may be used to transfer, guide, direct or collimate a beam of ions of interest from an ion source into a mass spectrometer detector or mass analyser for analysis by their mass to charge ratio. This interface component may be used as a vacuum interface for an atmospheric pressure ionisation (API) mass spectrometer (MS) system. Such an interface component desirably comprises a nozzle having a diverging portion providing for acceleration of the ions as they pass through. The nozzle may be configured to have only a diverging portion or may also a converging portion. Such an arrangement known as a de Laval, or converging-diverging, nozzle is described for use as a vacuum interface to transfer a beam of ions from an atmospheric pressure ionisation source into a vacuum chamber for analysis by a mass spectrometer in an API-MS system.

BACKGROUND OF THE INVENTION

Mass spectrometry (MS) is a powerful analytical technique that is used for the qualitative and quantitative identification of organic molecules, peptides, proteins and nucleic acids. MS offers speed, accuracy and high sensitivity. Key components of a mass spectrometer are the ion source, ion coupling optics, mass analyser and detector. The ion source transforms analyte molecules into a stream of charged particles, or ions, through a process of electron addition or subtraction. The ions can be 'steered' using electric or magnetic fields. Ion coupling optics or lenses collimate the ion flux from the ion source into the mass analyser. The analyser separates ions by their mass to charge ratio. Several different kinds of mass analyser are known in the art, including, but not limited to; magnetic sector, quadrupole, ion trap, time of flight and cycloidal. The ions exit the analyser in order of mass to charge ratio and in so doing produces a mass spectrum which is a unique signature or 'fingerprint' for the analyte. Ions are directed to a detector where they impact and discharge an ion current which may be counted and amplified by signal electronics before being displayed on a computer screen as a mass spectrum. The detector is normally an electron multiplier. These components together form the analytical sub-systems of the mass spectrometer system. Other mass spectrometer system components include vacuum pumps, a vacuum chamber, drive electronics, data acquisition electronics, power supplies and enclosures.

It is sometimes necessary to ionise certain molecules, particularly if less volatile, with higher boiling points and in liquid or solid phase, at atmospheric pressure. Ions are generated at atmospheric pressure are therefore outside the vacuum chamber. Typical API techniques include, but are not limited to, electrospray ionisation (ESI), nanospray ionisation, atmospheric pressure chemical ionisation (APCI), desorption electrospray ionisation (DESI), atmospheric pressure glow discharge ionisation (APGDI) or direct analysis in real-time (DART).

To transfer ions generated at atmospheric pressure inside the vacuum chamber a vacuum interface is required. The function of a vacuum interface is to provide a means of allowing ions generated at atmospheric pressure to be passed into a high-vacuum system for analysis by a mass spectrometer. Ideally, the vacuum interface ensures that the ions preferentially travel in a forward direction, so that they can be efficiently passed into a mass spectrometer for analysis. The vacuum interface should also use orifices of sufficient size that they do not easily clog, but at the same time match the flow rates of ions, and the much larger associated flow of neutrals, to the pumping speed of the vacuum pumps to ensure that a vacuum is maintained in order for the mass spectrometer to operate effectively. Finally, the ideal vacuum interface also enhances the transmission of ions compared with neutrals, or increases the concentration of ions relative to neutrals.

SUMMARY OF THE INVENTION

These and other problems are addressed by an interface between an atmospheric pressure ionisation source and a mass spectrometer system comprising a diverging portion which serves to allow for acceleration of a beam of ions as they are transferred into a mass spectrometer for analysis. The nozzle may also comprises a converging portion, such as provided by a de Laval nozzle, also known as a converging-diverging or 'con-di' nozzle.

Given the limit in leak rate set by the vacuum pumps, the vacuum interface needs to make better use of the available ions by forcing them to travel in a preferential, axial direction into an ion guide or the mass analyser. The present inventors have realised that such a result is also desired in a turbine or a rocket engine. In both these known arrangements there is a desire to force molecules to travel as fast as possible in an axial direction, in the former case so that the molecular stream can act effectively on a rotating impeller and in the latter to provide maximum thrust. In each case, this can be achieved by use of what is known as a de Laval nozzle, an improved turbine nozzle based on a convergent input followed by a divergent output. The de Laval nozzle was first applied to the rocket engine by the early pioneer Robert Goddard. The present inventors have realised that such geometry could be usefully employed within the context of an interface component between an ion source and a mass analyser.

The de Laval nozzle takes advantage of the counter-intuitive behaviour of compressible flow. In incompressible flow (i.e. flow of a liquid), continuity implies that decreasing the cross-section of a flow channel must increase the flow velocity. In compressible flow (i.e. flow of a gas) this increase can only be maintained up to Mach 1, the speed of sound. Once Mach 1 has been reached, decreasing the channel cross-section any further makes no difference. Instead, a further increase in flow velocity can only be obtained if the channel cross-section is increased. The increase in velocity is obtained in a constant entropy process by cooling the molecules, so that their thermal energy is traded for an increase in kinetic energy in the desired axial direction. At the same time, the pressure drops.

It can be shown the expected improvement in useful centreline flux over an effusive source (for equal flows) is $\gamma M^2/2+3/2$, where $\gamma$ is the ratio of the specific heats and M is the Mach number. Since $\gamma$ is of about 1, and M is typically>20 in a well designed jet expansion system, the improvement could be very significant (i.e. several hundred-fold).

In one embodiment of the invention, a de Laval nozzle acts as an interface between an atmospheric pressure ionisation source and a mass spectrometer inside a vacuum vessel. The de Laval nozzle transfers ions from the API directly to the vacuum chamber should result in the desired axial flow into the mass spectrometer. The flow in the converging section of the nozzle is very similar to the local flow at the input to a simple orifice, but the diverging section directs and accelerates the flow. Consequently, by use of a nozzle having a portion of which defines a diverging inner path, such as that provided by a de Laval nozzle, it is possible to improve the useful ion flux very considerably.

In certain configurations it has been found that a de Laval nozzle used as a single stage interface between atmospheric pressure and the vacuum chamber desirably should be provided having the same limiting aperture size or throat size as a simple orifice. In such an arrangement it will be appreciated that clogging of the nozzle could arise. To obviate such problems it is possible to provide a larger throat. This however has a disadvantage of needing larger pumps to maintain vacuum.

To address this problem, in another embodiment of the invention, the solution to the problem of very small apertures is to use a two-stage, or multi-stage, system. In the first stage, the expansion of the gas is only carried out to an intermediate pressure. A much larger input orifice can now be used, because pumps operating at intermediate pressure can have much higher pumping rates than a vacuum pump such as a turbo at the same pressure. They can also start pumping at atmosphere, a necessity for practical operation. The excess flux of molecules is simply pumped away before it reaches the second, low vacuum chamber. A second orifice between the first intermediate vacuum chamber and the second main vacuum chamber transfers a stream of ions and neutrals into the main vacuum chamber. In this embodiment a de Laval nozzle or alternatively a diverging only nozzle may be substituted for either the input orifice or the second orifice, or for both. Likewise in a multi-stage system, a combination of nozzles may be used as an interface between one or more of the vacuum chambers held at different pressures. The specific configuration for each of these plurality of nozzles where used will depend on the specifics of the interface required. It will however be appreciated that where further expansion is required a diverging nozzle only is a desirable option.

In another embodiment, a DC or AC ion guide could be used after the nozzle to efficiently transfer the ions to mass analyser for analysis. The ion guide increases the concentration of ions by trapping and focusing the ions in the stream while at the same time pumping away neutrals. The ion beam may be focused by means of an electrostatic or electrodynamic field between the electrodes of the ion guide. In the case of a RF ion guide, a pseudopotential well is created between the electrodes by the changing electrical field. The pseudopotential well focuses and collimates the ion beam down the axis of the ion guide. In the presence of neutral gas molecules at certain pressures where the mean free path is sufficiently short that the frequency of collisions between neutrals and ions is relatively high, collisional focusing may be induced to further focus the ion beam.

Alternatively, by applying a DC bias to either nozzle, enrichment of the ion concentration in the vicinity of the nozzle may be achieved.

In another embodiment, the pre-filter of a quadrupole mass analyser is used as an ion guide by simply lengthening it so that it captures the supersonic stream of ions and neutrals as it exits from the diverging section of the nozzle. In this embodiment, the pre-filter or ion guide is positioned so that the leading edges of the rods are placed either inside or outside the diverging section of the nozzle such that the pre-filter rods capture or intercept the supersonic stream of ions exiting the nozzle. The field generated between the pre-filter rods then traps and guides the ions. The pre-filter or ion guide would continue for a length such that the neutrals were likely to be pumped away, and would trap and focus ions within the pseudopotential field of the ion guide so that only ions were left by the time they reached the mass analyser.

The nozzle may be fabricated using a process capable of generating the dimensions and tolerances required to create the ideal diverging section and if providing a converging portion as well then the process will also desirably generate the dimensions and profiles of an ideal converging section and throat portion. The throat diameter should be small enough to maintain vacuum (e.g. throat diameter ~50 um) inside the vacuum chamber, but with the correct converging-diverging nozzle profile necessary to collimate and accelerate a beam of ions and neutrals to supersonic velocities. Where an individual nozzle is fabricated from a plurality of regions, it is desirable that the converging portion should precede the throat portion which should precede the diverging portion.

Some possible techniques for fabricating such a nozzle include:

- Direct stereolithography or rapid prototyping of the appropriate geometry from a polymer
- Direct stereolithography or rapid prototyping of the appropriate geometry from a polymer followed by some post-processing to produce smooth surfaces such as polishing
- Stereolithography of a negative from polymer which could then be used as mould
- Injection moulding of plastic, composite or conductive composite
- Injection moulding of plastic or composite followed by electroplating
- Electroforming from metal
- Crystal plane etching of one or more sides of a semiconductor material to generate an approximation to the ideal nozzle geometry
- Deep Reactive Ion Etch (DRIE) etching of two sides of a semiconductor material to generate the nozzle profile
- Electrical Discharge Machining of metal to generate the nozzle profile
- Generation of the ideal nozzle profile from a hybrid device assembled from subcomponents fabricated using some or all of the processes above.

In another arrangement, the nozzle may be a hybrid device based on machined converging and diverging sections coupled with a micro-engineered throat section. In a hybrid device, part of the nozzle, for example the throat, could be fabricated and attached to a larger, conventionally machined (or turned, or EDM machined, or injection moulded or micromachined, or electroformed) diverging nozzle part with the correct geometry to further accelerate and focus ions and neutral gas molecules into the mass analyser. The advantage of a hybrid device is that the diverging section could have the larger dimensions and geometry necessary to promote acceleration to higher mach numbers. Also, the cheaper, micromachined part could be disposable, with machined, metal part being fixed.

Another configuration for such a hybrid approach is to fabricate a hybrid nozzle by etching the narrower throat section from a semiconductor material and to attach this micromachined part to a conventionally turned, or EDM-fabricated, longer diverging nozzle part. Again, the micromachined part would be disposed of when clogged.

These and other features and benefits will be understood with reference to the following exemplary embodiments.

DETAILED DESCRIPTION

A detailed description of preferred exemplary embodiments of the invention is provided with reference to FIGS. 1 to 10, and Table 1.

Figure 1A:
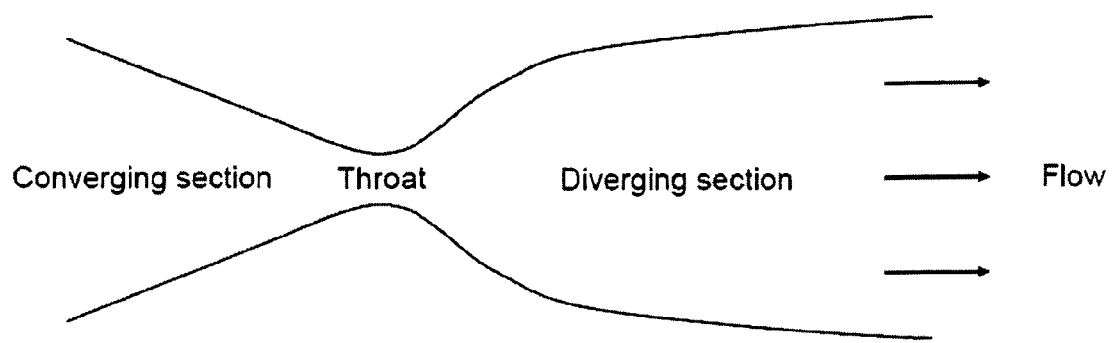
FIG. 1A is a diagram of the classic de Laval nozzle.

FIG. 1A is a diagram of the classic de Laval nozzle with a converging section, a throat and a diverging section. The purpose of the converging section is to achieve flow of Mach 1 at the throat. Downstream at the exit to the diverging section axial flow is accelerated to supersonic velocities, and the flow is largely collimated around the centreline of the nozzle.

Figure 1B:
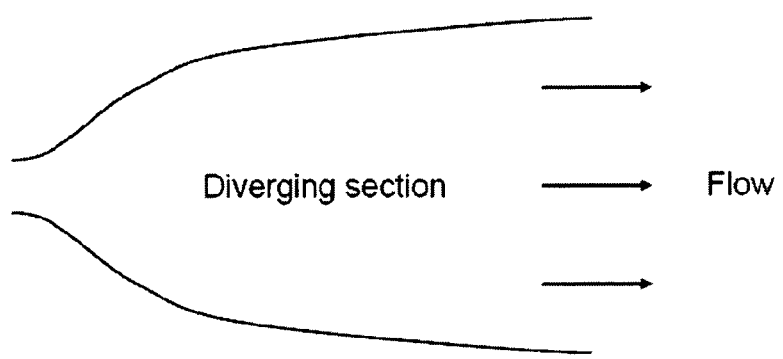
FIG. 1B is a diagram of the de Laval nozzle without the converging section.

FIG. 1B is an example of a nozzle without the converging section that was evident in FIG. 1A. Such an embodiment provides a diverging portion and could be substituted for the classic case shown in FIG. 1A in any of the embodiments disclosed herein.

Figure 2:
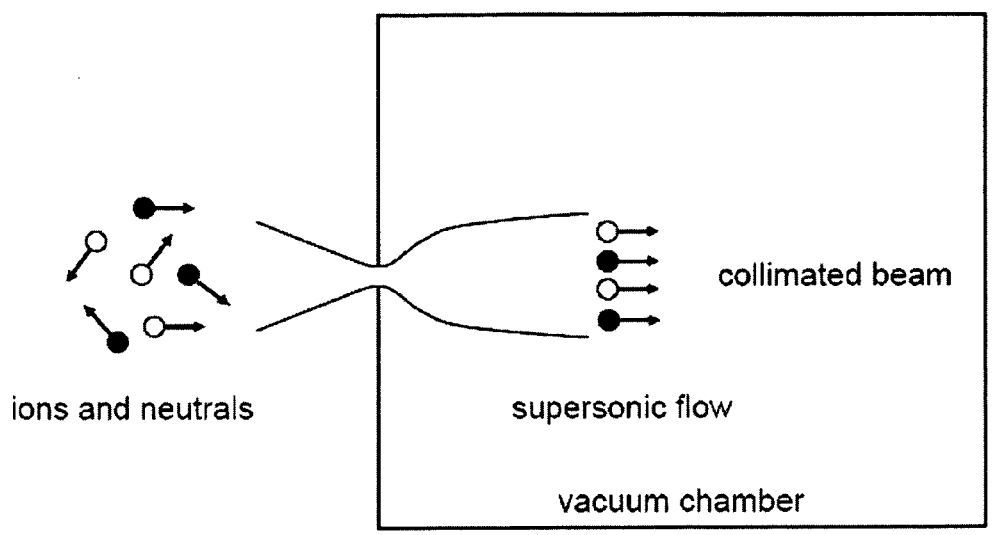
FIGS. 2 & 3 depict a de Laval nozzle in use as a vacuum interface for a atmospheric pressure ionisation mass spectrometer.

FIG. 2 shows the mass spectrometer system of the invention wherein a de Laval nozzle is used as a vacuum interface to transfer ions between an atmospheric pressure ionisation (API) source and a mass analyser. Typical API techniques include, but are not limited to, electrospray ionisation (ESI), nanospray ionisation, atmospheric pressure chemical ionisation (APCI), desorption electrospray ionisation (DESI), atmospheric pressure glow discharge ionisation (APGDI) or direct analysis in real-time (DART).

Figure 3:
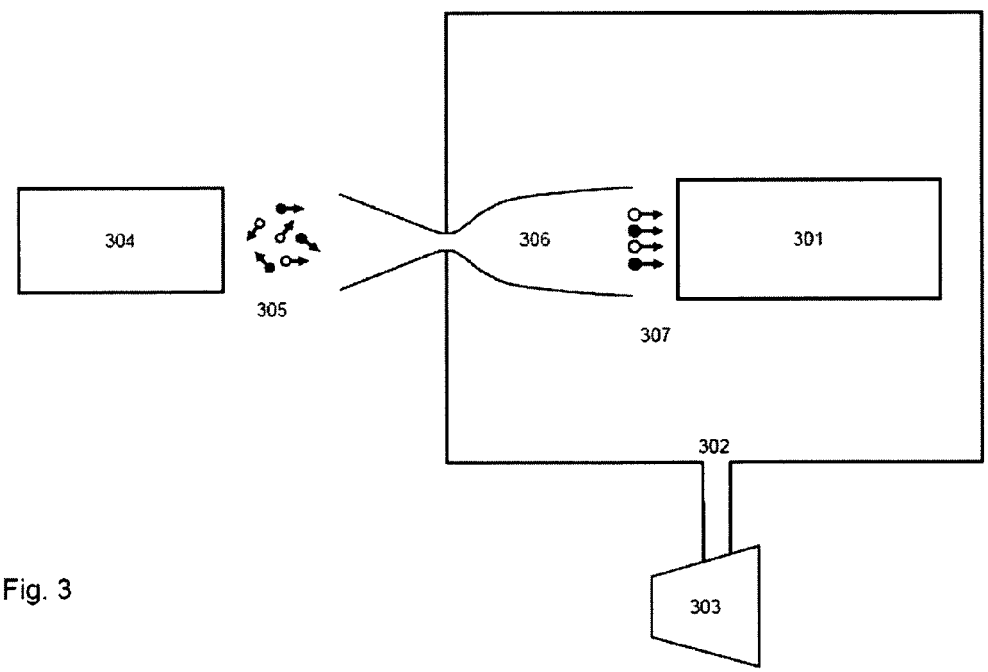

In FIG. 3 the nozzle 306 of the mass spectrometer system of the invention acts as an interface between an atmospheric pressure ionisation (API) source 304 and a mass analyser 301, and produces a well-collimated, supersonic beam of ions and neutrals 307 at the exit of its diverging section which is located inside the vacuum chamber 302. The vacuum chamber is maintained at a pressure suitable for operation of the mass analyser by vacuum pumps 303. This focused, supersonic beam 307 is presented to a mass analyser 301 where the ions are analysed by their mass to charge ratios. The mass analyser may be a quadrupole, ion trap, time of flight, 'orbitrap', magnetic sector, Fourier transform, cycloidal MS or some other mass analyser.

Figure 4A:
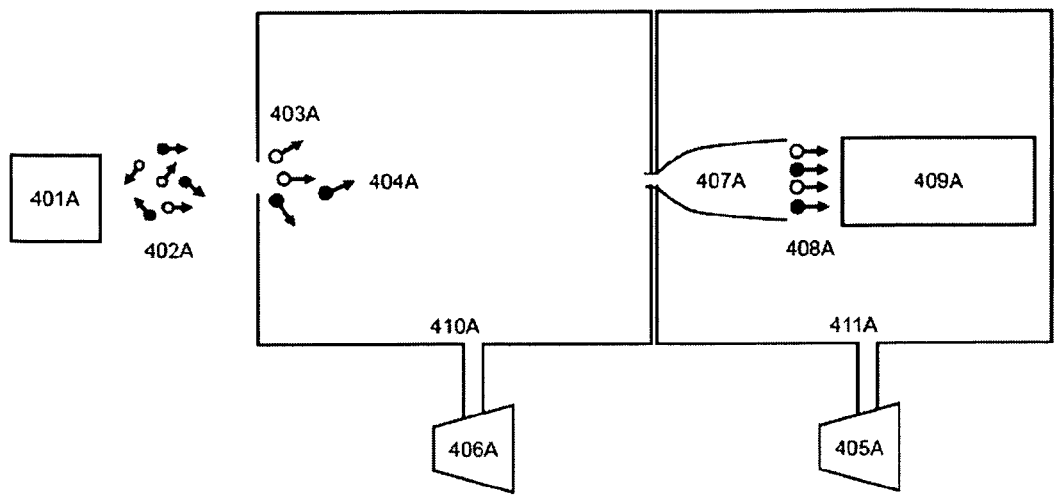
FIGS. 4A & 4B are schematics of a mass spectrometer system with two vacuum chambers and different configurations of simple orifice and nozzle.

FIG. 4A is the mass spectrometer system of the invention with two vacuum chambers 410A and 411A. The first vacuum chamber 410A communicates with an API source 401A via a simple orifice 403A. Ions and neutrals 402A from the API source 401A travel into the first vacuum chamber 410A which is held at an intermediate pressure greater than that of the second chamber 411A by a first vacuum pump, or pumps 406. This pump 406 is preferably a small diaphragm or rotary pump. The stream of ions and neutrals enter the intermediate chamber effusively 404A. Some fraction of these ions and neutrals are pumped away into the first pump 406A, the remaining particles are transferred into the second chamber via the nozzle 407A, finally entering a second, high vacuum chamber as a well-collimated, supersonic beam of ions and neutrals 408A which are then analysed by a mass analyser 409A. The second vacuum chamber 411A is maintained at a lower pressure than the first chamber by a vacuum pump, or pumps 405A. Pump 405A is preferable a turbomolecular pump.

Figure 4B:
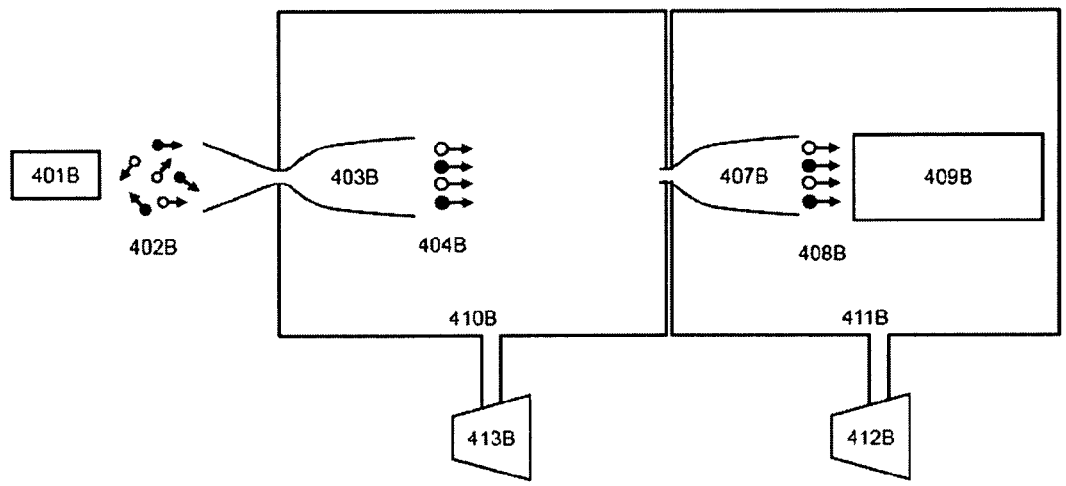

FIG. 4B is the mass spectrometer system of the invention with two vacuum chambers as in FIG. 4A, but with the first, simple orifice replaced with the nozzle of the invention. Ions are generated at the API source 401B and are transported, accelerated and collimated into a supersonic stream 404B along with atmospheric neutrals by a nozzle 403B into a first region 410B at intermediate pressure. Some fraction of the ions and neutrals are pumped away, the remaining portion are again transported, accelerated and collimated by a second nozzle 407B into a supersonic beam 408B into a second chamber 411B held at a lower pressure where they are presented to a mass analyser 409B. The remaining ions are analysed by their mass to charge ratios in the mass analyser.

Figure 5:
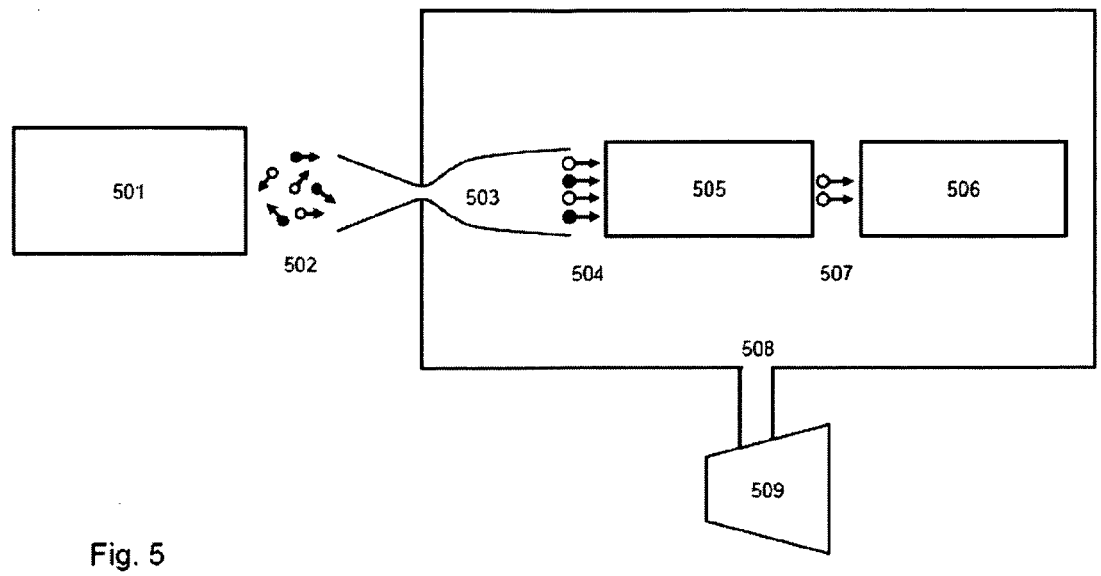
FIG. 5 is a schematic of a mass spectrometer system with a single vacuum chamber, nozzle, generic mass analyser and generic ion guide.

FIG. 5 is a schematic of one embodiment of the mass spectrometer system of the invention which features a single vacuum chamber 508 housing a mass analyser 506 and an ion guide 505. The vacuum chamber 508 communicates with an atmospheric pressure ionisation source 501 via a nozzle 503. Ions and neutrals moving randomly 502 are coupled into a nozzle 503. The nozzle 503 generates a supersonic beam of ions and neutrals 504 at the exit to its diverging section. This beam is collimated so it may be readily intercepted by, or received into, an ion guide 505. The function of the ion guide 505 is to enrich the ion beam by trapping and conveying ions inside an electrical or magnetic field while allowing neutrals to be pumped away by the pumps of the vacuum system 509. The beam 507 exiting this ion guide should have a lower proportion of neutral particles, and a higher proportion of ions. This ion beam 507 is presented to a mass analyser 506 for analysis. The ion guide 505 may be a DC or AC field generated by some arrangement of electrodes. Various arrays of electrodes, or various arrangements of electrode geometries, may be used to create a trapping and focusing field. Ion guides known in the art include quadrupoles, hexapoles, octopoles, stacked-ring ion guides, or a series of diaphragm electrodes.

Figure 6:
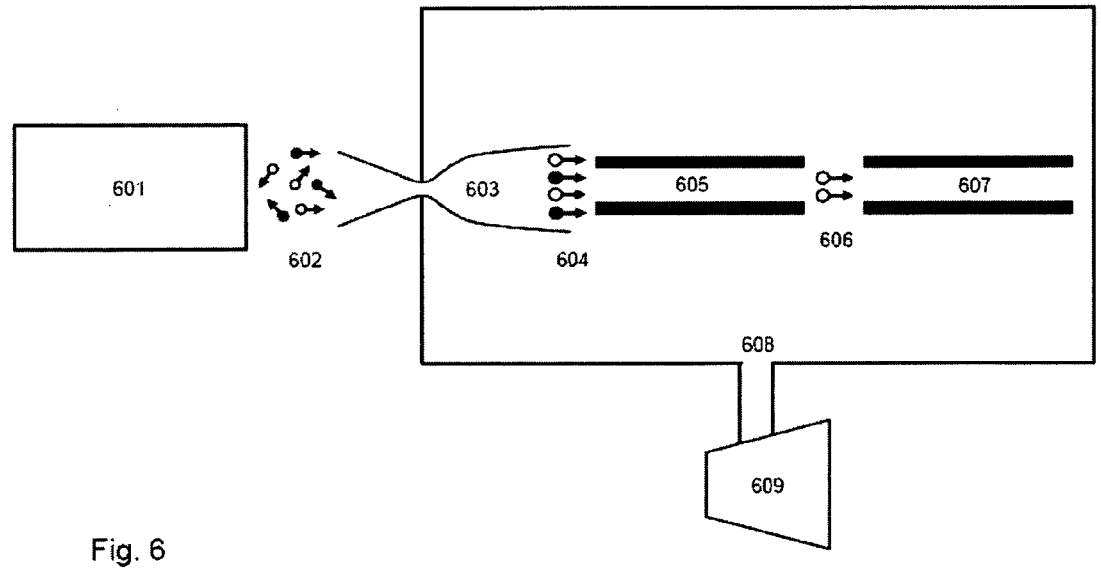
FIG. 6 is a schematic of the mass spectrometer system with a single vacuum chamber, nozzle, quadrupole mass analyser and quadrupole ion guide.

FIG. 6 is another embodiment of the mass spectrometer system of the invention featuring a single vacuum chamber 608 housing a mass analyser 607 and an ion guide 605. The vacuum chamber 608 communicates with an atmospheric pressure ionisation source 601 via a nozzle 603. The nozzle 603 generates a supersonic beam of ions and neutrals 604 at the exit to its diverging section. This beam is collimated, and can therefore can be intercepted by, or received into, an ion guide 605. In this embodiment the ion guide 605 is a quadrupole ion guide, and the mass analyser is a quadrupole mass analyser 607. The quadrupole ion guide 605 efficiently intercepts or captures the collimated beam of ions and neutrals 604 exiting the diverging section of the nozzle 603 at supersonic velocities. The neutral gas molecules are gradually pumped away by the pumps 609 in the ion guide 605, leaving a concentrated beam of ions 606 which is conveyed to a quadrupole mass analyser 607.

Figure 7:
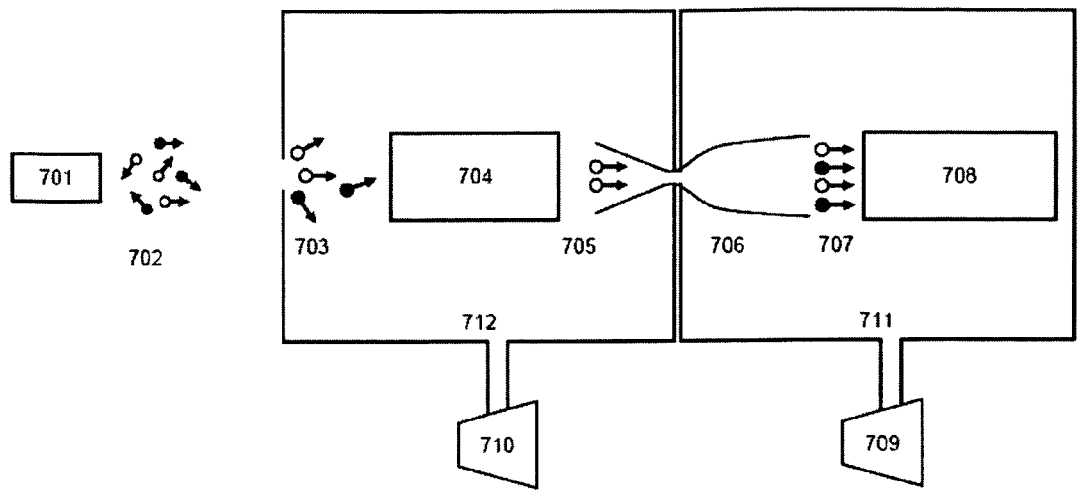
FIG. 7 is a schematic of a mass spectrometer system having two vacuum chambers, with a simple orifice communicating between an API source and an ion guide in the first chamber.

FIG. 7 is a two-chamber mass spectrometer system consisting of an API source 701 communicating with a first, intermediate pressure, chamber 712 via a simple orifice 703. The first chamber contains an ion guide 704. The second chamber 711 communicates with the ion guide 704 of the first chamber via a nozzle 706. The API source 701 generates ions outside the vacuum system. A mixture of ions and neutrals 702 is transferred into the first vacuum chamber via a simple orifice 703. These ions exit the orifice effusively 703. Some portion of this mixture of ions and neutrals enters an ion guide 704. The ion guide 704 may be a RF device such as a quadrupole, hexapole, octapole or a stack of ring electrodes, or annular or planar DC focusing electrodes. The ion guide 704 retains ions while allowing neutrals to be pumped away 710. The ions exit the ion guide 705 and enter a nozzle 706, where they are accelerated along with remaining neutrals into a second chamber. The ions exit the nozzle supersonically 707, and are received by a mass analyser 708. In an alternative embodiment, ion enrichment may be achieved by applying a DC bias to second nozzle 706, ions may be draw into its converging section, or concentrated down the centreline of nozzle 706 by repelling them from its surfaces.

Figure 8:
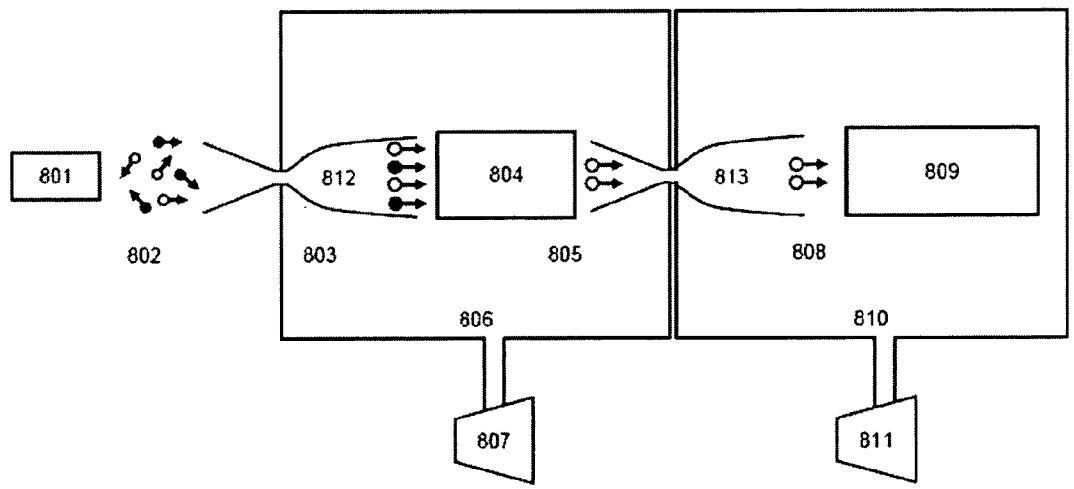
FIG. 8 is the system of FIG. 7 with the first orifice replaced by a nozzle.

FIG. 8 is an embodiment of a two-chamber mass spectrometer system consisting of an API source 801 communicating with a first, intermediate pressure, chamber 806 via a first nozzle 812, and a second, high vacuum, chamber 810 communicating with the first 806 via a second nozzle 813. The first chamber contains an ion guide 804. The second chamber communicates with the first chamber, and the ion guide 804 of the first chamber, via a nozzle 813. The API source 801 generates ions 802 outside the vacuum system. A mixture of ions and neutrals 802 is transferred into the first vacuum chamber 806 via the first nozzle 812. These ions and neutrals exit the nozzle supersonically, and enter an ion guide 804. The ion guide 804 may be a RF device such as a quadrupole, hexapole, octapole or a stack of ring electrodes, or annular or planar DC focusing electrodes. The ion guide retains ions while allowing neutrals to be pumped away 807. The ions exit the ion guide 805 and enter a second nozzle 813, where they are again accelerated 808 along with remaining neutrals into a second chamber 810. The ions exit the nozzle supersonically 808, and are received by a mass analyser 809.

Figure 9A:
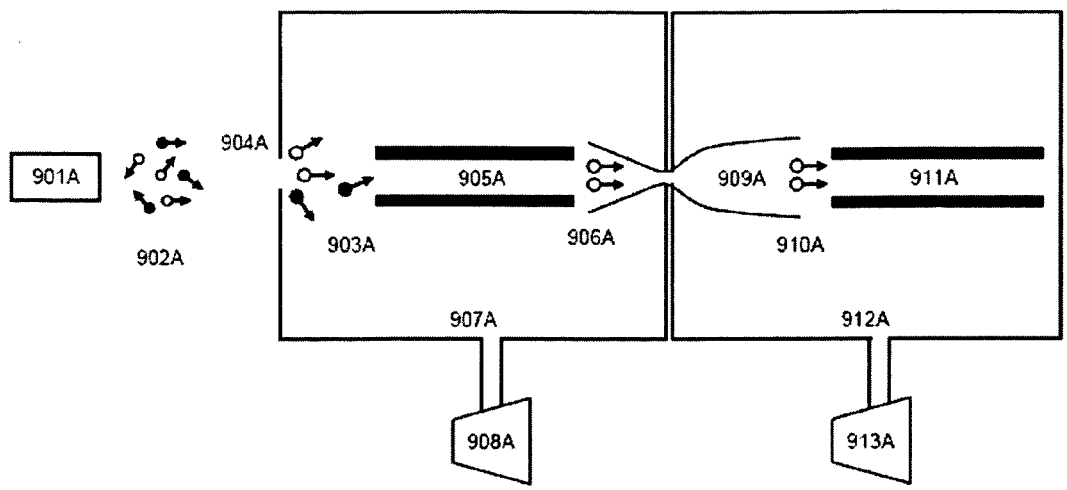
FIG. 9A is the system of FIG. 7 wherein the ion guide is a RF quadrupole, and the analyser is a quadrupole mass spectrometer.

FIG. 9A is a diagram of an embodiment of a two-chamber mass spectrometer system with an API source 901A communicating with a first vacuum chamber 907A via a simple orifice 904A. The first chamber 907A is held at a pressure intermediate between the pressure of the second chamber and atmospheric pressure. The first chamber 907A contains an ion guide 905A, which is preferably a quadrupole operated in RF mode as an ion conveyor or ion transporter. Ions and neutrals enter the first chamber effusively 903A. Some portion of this effusive mixture is intercepted by the RF ion guide 905A. Ions are retained while neutral gas molecules are gradually pumped away by the vacuum system 908A. Ions 906A exit the ion guide 905A through a second nozzle 909A where they are accelerated and collimated into the second chamber 912A as a beam 910A. The second chamber 912A is held at a lower, high vacuum, pressure by the vacuum system 913A. This beam of ions and remaining neutrals 910A is intercepted, captured or received by a mass analyser 911A, preferably a quadrupole mass spectrometer. The ions are analysed by the quadrupole MS 911A in the high vacuum chamber 912A.

Figure 9B:
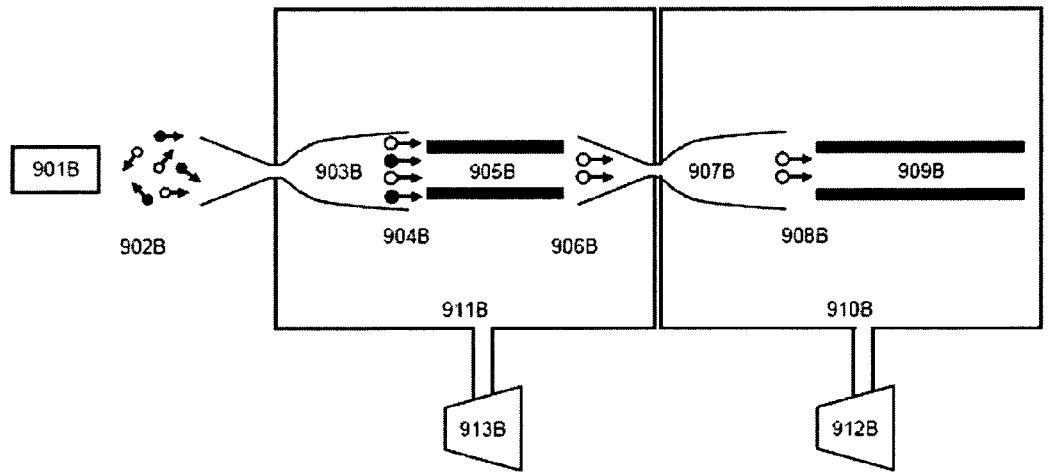
FIG. 9B is the system of FIG. 8 wherein the ion guide is a RF quadrupole, and the analyser is a quadrupole mass spectrometer.

FIG. 9B is another embodiment of the mass spectrometer system of the invention featuring an API source 901B and two vacuum chambers 911B and 910B wherein ions and neutrals 902B are transported into the first, intermediate pressure chamber 911B via a first nozzle 903B rather than a simple orifice. Ions and neutral gas molecules exit the diverging section of the first nozzle as supersonic beam 904B. Since this beam 904B is collimated, it can be intercepted, captured or received by a RF ion guide 905B located at the exit of the first nozzle 903B, inside the intermediate pressure chamber 911B. Ions are trapped and guided down the centreline of the RF ion guide 905B, preferably a RF quadrupole, while neutral gas molecules are gradually pumped away by the vacuum system. At the exit of the ion guide 905B there is a higher concentration of ions to neutrals 906B. These ions and remaining neutrals are transferred to the second, high vacuum chamber 910B via a second nozzle 907B. This nozzle 907B generates a well-collimated supersonic beam 908B which exits the diverging section of the second nozzle inside the high vacuum chamber. This beam is intercepted 908B or received by a mass analyser 909B, preferably in this embodiment a quadrupole mass spectrometer. The ions are analysed by their charge to mass ratios, generating a mass spectrum at a Channeltron or multiplying detector situated at the exit of the quadrupole mass spectrometer 909B.

Figure 10:
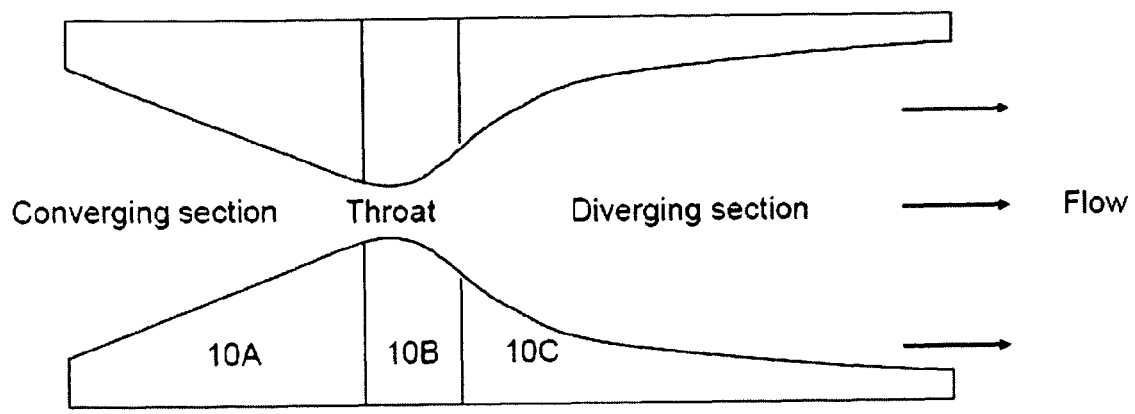
FIG. 10 is a schematic of a classic de Laval nozzle delineated into three different regions which may be integrally fabricated or formed from one or more individual assemblies.

FIG. 10 is a schematic of the classic de Laval, or converging-diverging, nozzle. In this embodiment, the nozzle profile may be created through fabrication of one or more sections which may be subsequently assembled. This hybrid approach may be particularly useful when it is impossible to obtain the necessary tolerances and dimensions required along the profile from one manufacturing process. For illustration, 3 sections are shown in FIG. 10.

In one embodiment, sections 10A, 10B and 10C can fabricated separately using the combinations of the processes and materials represented by the hatched regions in Table 1. Those hatched regions on Table 1 represents preferred machining techniques for the materials listed. The materials are composite materials (including conductive polymers), polymer, polyimide, Su8, semiconductor materials, glass, Pyrex and ceramic and diamond. The processes listed are micro-injection moulding, Excimer laser machining, electroforming, crystal plane etching, wet etching, LIGA, Deep Reactive Ion Etching, Reactive Ion Etching, Electrical Discharge Machining, Stereo-lithography, laser machining, ultrasolic polishing and metal wire draw through polishing. Sections 10A, 10B and 10C fabricated using some combination of these processes and materials may be subsequently assembled together to form the nozzle vacuum interface for use in an API-MS.

TABLE 1

| | Composite | Polymer | Polyimide | Plastic | Metal | Semiconductor | Glass | Pyrex | Ceramic | Diamond |
|---|---|---|---|---|---|---|---|---|---|---|
| Micro injection moulding | ✓ | ✓ | ✓ | ✓ | ✓ | | | | | |
| Eximer laser machining | ✓ | ✓ | ✓ | ✓ | | ✓ | ✓ | ✓ | ✓ | ✓ |
| Electroforming | | ✓ | | | ✓ | | | | | |
| Crystal plane etching | | | | | | ✓ | | | | |
| Wet etching | ✓ | ✓ | ✓ | ✓ | ✓ | ✓ | ✓ | ✓ | ✓ | ✓ |
| LIGA | ✓ | ✓ | ✓ | ✓ | ✓ | | | | | |
| DRIE | | | | | | ✓ | ✓ | ✓ | | |
| RIE | | | | | | ✓ | ✓ | ✓ | ✓ | ✓ |
| EDM | | | | | ✓ | ✓ | | | | |
| Stereolithography | ✓ | ✓ | ✓ | ✓ | | | | | | |
| Laser machining | ✓ | ✓ | ✓ | ✓ | ✓ | ✓ | ✓ | ✓ | ✓ | ✓ |
| Ultrasonic polishing | | | | | ✓ | ✓ | ✓ | ✓ | ✓ | ✓ |
| Wire polishing | | | | | ✓ | ✓ | ✓ | ✓ | ✓ | ✓ |

While the methodologies of Table 1 may be usefully employed in fabrication of a nozzle, a particularly useful methodology will now be described with reference to FIG. 10.

It will be appreciated from the discussion heretofore that a nozzle used as an interface component will include a diverging portion. Such a nozzle may also include a throat portion and a converging portion. In such a latter arrangement the nozzle will resemble the type of nozzle classically referred to as a de Laval nozzle. As a nozzle provided in accordance with the present teaching may incorporate the diverging portion in combination with one or more of the other two portions it is useful to consider these as being distinct regions which may be integrally formed as a single piece or which could be fabricated separately and mounted relative to one another to form a finished interface component. To illustrate this, FIG. 10 shows the arrangement of a de Laval nozzle delineated into three distinct regions: a converging portion 10A, a throat portion 10B and a diverging portion 10C. It will be appreciated from an inspection of FIG. 3 that the separation between side walls in the converging and diverging portions is much greater than that in the throat portion. The proximity of the majority of the ions passing through this centre region to the side walls is much greater than the proximity of the majority of the ions to the side walls of the converging and diverging regions.

As the ions are in closer proximity to the side walls it is possible that their flight through this region could be affected by the surface treatment of the side walls. The present invention provides for a minimisation of such effects by highly polishing the side walls of this centre region. It will be understood that the centre region will desirably include at least the throat portion 10B and may optionally comprise at least one of a trailing part of the converging portion (i.e. that part of the converging portion immediately preceding the throat portion 10B) and a leading part of the diverging portion (i.e. that part of the diverging portion immediately following the throat portion 10B). To enable the provision of a highly polished surface it is desirable to provide the side walls of this centre region from a very hard material such as for example diamond or ceramic. It will be appreciated that the choice of material may depend on the desired longevity of the final structure and the degree of polishing required, but it is desirable that the material be selected from those materials having a hardness value of at least 8 on the Mohs scale.

The provision of such a hard material allows for the surface treatment of the side walls of the region fabricated from that hard material to provide a highly polished surface. This surface treatment could, in an exemplary arrangement, be provided by using ultrasonic polishing and/or by drawing and rotating a metal wire through the centre region with a suitable polishing compound.

If the side walls of this centre region are fabricated from a material so as to provide a hard surface for subsequent polishing, it is possible to form the side walls separate to the body of the region. A preferred arrangement however is to fabricate the entire region from the same material. By providing a block of such a hard material, one or more lasers could be used to create the accurate internal diverging profile and throat in this very hard material. If required on the opposite side, a converging profile would be added. The full internal profiles would be machined into the remaining parts made from metal or similar easily machinable material to create the assembled nozzle shape.

It will be appreciated that what has been described herein are exemplary arrangements of an interface component for coupling ions generated within an ion source into a mass spectrometer for subsequent analysis. The interface component includes a nozzle defining an interior path through which the ions may pass. At least a portion of this interior path includes surfaces which diverge from one another. As a result ions passing within this diverging region will undergo acceleration, up to speeds that may approach and/or exceed supersonic speeds. The geometry of the diverging portion of the nozzle is desirably a bell-shaped geometry. The actual dimensions of the nozzle will depend on the desired acceleration that is required and also the pressure differential between the inlet and outlet portion of the interface. The affect of such design parameters will be known to the person skilled in the art of compressible flow and fluid dynamics. Such a nozzle, as provided within the context of the present teaching, operably provides acceleration to at least supersonic speeds and also provides for collimation of the ions passing through the nozzle. The spacing of the side walls of the nozzle is desirably optimised to minimise any shock waves resultant from the acceleration of the ion flow affecting the flow.

While the invention has been described with reference to different arrangements or configurations it will be appreciated that these are provided to assist in an understanding of the teaching of the invention and it is not intended to limit the scope of the invention to any specific arrangement or embodiment described herein. Modifications can be made to that described herein without departing from the spirit or scope of the teaching of the present invention. Furthermore where certain integers or components are described with reference to any one figure or embodiment it will be understood that these could be replaced or interchanged with those of another figure—or indeed by elements not described herein—without departing from the teaching of the invention. The present invention is only to be construed as limited only insofar as is deemed necessary in the light of the appended claims.

The words comprises/comprising when used in this specification are to specify the presence of stated features, integers, steps or components but does not preclude the presence or addition of one or more other features, integers, steps, components or groups thereof.

What is claimed is:

1. A mass spectrometer vacuum interface component for operably coupling an atmospheric ion source to a mass analyser, the interface component comprising a diverging nozzle having an interior path through which ions may pass from the ion source into the mass analyser, and wherein within a diverging portion of the nozzle, surfaces defining the interior path diverge from one another such that ions passing therethrough undergo acceleration to supersonic speeds and are collimated prior to introduction into the mass analyser for analysis by their mass to charge ratio.

2. The interface component of claim 1 wherein the nozzle includes a converging portion within which surfaces defining the interior path converge towards one another.

3. The interface component of claim 2 wherein the converging portion is separated from the diverging portion by a throat portion.

4. The interface component of claim 3 wherein the nozzle is a converging-diverging nozzle configured such that operably ions exit the interface component at supersonic speeds.

5. The interface component of claim 2 wherein the converging portion is provided before the diverging portion.

6. The interface component of claim 1 wherein at least a portion of the nozzle has side walls fabricated from a material having a hardness value of at least 8 on the Mohs scale.

7. The interface component of claim 6 wherein the nozzle comprises a throat portion provided before the diverging portion and wherein side walls of the throat portion are fabricated from the material having a hardness value of at least 8 on the Mohs scale.

8. The interface component of claim 6 wherein the material is selected from diamond or ceramic.

9. The interface component of claim 6 wherein the side walls fabricated from the hard material are polished.

10. A mass spectrometer system configured to analyse ions, the system comprising an atmospheric pressure ion source and a mass analyser, the ion source and analyser being coupled to one another via an interface component, the component comprising:
a diverging nozzle wherein the nozzle defines an interior path through which the ions may pass from the ion source into the mass analyser, and wherein within a diverging portion of the nozzle, surfaces defining the interior path diverge from one another such that ions passing therethrough undergo acceleration to supersonic speed prior to their introduction into the mass analyser for analyse based on mass to charge ratio.

11. The system of claim 10 wherein the nozzle includes a converging portion within which surfaces defining the interior path converge towards one another.

12. The system of claim 11 wherein the converging portion is separated from the diverging portion by a throat portion.

13. The system of claim 11 wherein the converging portion is provided before the diverging portion.

14. The system of claim 10 wherein the nozzle is a converging-diverging nozzle configured such that operably ions exit the interface component at supersonic speeds.

15. The system of claim 10 wherein at least a portion of the nozzle has side walls fabricated from a material having a hardness value of at least 8 on the Mohs scale.

16. The system of claim 15 wherein the nozzle comprises a throat portion provided before the diverging portion and wherein side walls of the throat portion are fabricated from the material having a hardness value of at least 8 on the Mohs scale.

17. The system of claim 15 wherein the material is selected from diamond or ceramic.

18. The system of claim 15 wherein the side walls fabricated from the hard material are polished.

19. The system of claim 10 further comprising a vacuum chamber, the mass analyser being provided within the vacuum chamber.

20. The system of claim 19 wherein the diverging nozzle terminates within the vacuum chamber.

21. The system of claim 10 configured as a multi-stage system including a first and second vacuum chamber, the pressure within the first vacuum chamber being greater than the pressure within the second vacuum chamber, the first vacuum chamber being in fluid communication with the ion source and the mass analyser being provided within the second vacuum chamber.

22. The system of claim 21 wherein the nozzle is provided between the first and second vacuum chambers such that ions exiting the first vacuum chamber into the second vacuum chamber are accelerated.

23. The system of claim 22 comprising a second nozzle provided between the ion source and the first vacuum chamber.

24. The system of claim 21 comprising an ion guide provided in at least one of the first and second vacuum chambers.

25. The system of claim 24 wherein the ion guide is provided in a first vacuum chamber and the mass analyser is provided in a second vacuum chamber.

26. The system of claim 24 wherein the ion guide is operable in an AC or DC configuration.

27. The system of claim 24 wherein the ion guide is a quadrupole ion guide.

28. The system of claim 21 comprising an ion guide provided between the nozzle and the mass analyser such that an ion beam exiting the interface component is directed into the ion guide prior to entry into the mass analyser.

29. The system of any one of claim 10 wherein a DC bias voltage is operably coupled to the interface component.

30. An interface component for coupling an atmospheric ion source to a mass analyser, the interface component comprising a diverging nozzle, wherein the nozzle defines an interior path through which the ions may pass from the ion source into the mass analyser, and wherein within a diverging portion of the nozzle, surfaces defining the interior path diverge from one another such that ions passing therethrough undergo acceleration to supersonic speeds prior to their introduction into the mass analyser for analysis based on their mass to charge ratio.

* * * * *